(12) United States Patent
Pedretti et al.

(10) Patent No.: US 10,661,934 B2
(45) Date of Patent: May 26, 2020

(54) UNIT AND METHOD FOR FORMING/ADVANCING A PACK OR A PORTION OF A PACK

(71) Applicant: Tetra Laval Holdings & Finance S.A., Pully (CH)

(72) Inventors: John Richard Pedretti, Formigine (IT); Massimo Pradelli, Reggio Emilia (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/306,594

(22) PCT Filed: Jun. 1, 2017

(86) PCT No.: PCT/EP2017/063339
§ 371 (c)(1),
(2) Date: Dec. 3, 2018

(87) PCT Pub. No.: WO2017/211687
PCT Pub. Date: Dec. 14, 2017

(65) Prior Publication Data
US 2019/0161224 A1    May 30, 2019

(30) Foreign Application Priority Data
Jun. 9, 2016 (EP) .................................... 16173631

(51) Int. Cl.
*B65B 51/30* (2006.01)
*B65B 65/00* (2006.01)
(Continued)

(52) U.S. Cl.
CPC ............ *B65B 51/306* (2013.01); *B29C 65/02* (2013.01); *B29C 66/0062* (2013.01);
(Continued)

(58) Field of Classification Search
CPC ..... B65B 51/306; B65B 9/2014; B65B 65/00; B65B 9/207; B65B 55/103; B29C 65/02;
(Continued)

(56) References Cited

U.S. PATENT DOCUMENTS

2003/0213217 A1    11/2003    Kondo et al.

FOREIGN PATENT DOCUMENTS

| WO | WO 00-64741 | 11/2000 |
| WO | WO 00-75603 | 12/2000 |

OTHER PUBLICATIONS

International Search Report and Written Opinion in corresponding PCT Application No. PCT/EP2017/063339 dated Jul. 31, 2017 (10 pages).

*Primary Examiner* — Christopher T Schatz
*Assistant Examiner* — Cynthia L Schaller
(74) *Attorney, Agent, or Firm* — Finnegan, Henderson, Farabow, Garrett and Dunner, LLP

(57) ABSTRACT

There is described a unit (1, 1', 1") for forming/advancing at least one pack (3) or at least one portion of a pack (3), comprising a frame (11, 12a, 12b), a selectively activatable/deactivatable source of power (42) and at least one carriage (14a, 14b) operationally coupled with source of power (42), movable along a path (13a, 13b) comprising at least one vertical portion (18a, 18b, 19a, 19b), and adapted to convey said at least one pack (3) or said at least one portion of a pack (3); unit (1, 1', 1") comprises stopping means (45) fitted to frame (12a, 12b) and which can be operated: to leave carriage (14a, 14b) free to advance along vertical portion (18a, 18b; 19a, 19b), when source of power (42) is activated, and to stop carriage (14a, 14b) along vertical portion (18a, 18b; 19a, 19b), when source of power is, in use, deactivated.

10 Claims, 7 Drawing Sheets

(51) Int. Cl.
    *B65B 9/20*          (2012.01)
    *B29C 65/00*        (2006.01)
    *B29C 65/02*        (2006.01)
    B65B 55/10         (2006.01)
    B65B 9/207         (2012.01)
    B29L 31/00         (2006.01)
    B29K 705/02       (2006.01)

(52) U.S. Cl.
    CPC ...... *B29C 66/1122* (2013.01); *B29C 66/4312* (2013.01); *B29C 66/71* (2013.01); *B29C 66/7234* (2013.01); *B29C 66/72321* (2013.01); *B29C 66/72328* (2013.01); *B29C 66/8351* (2013.01); *B29C 66/849* (2013.01); *B29C 66/872* (2013.01); *B65B 9/2014* (2013.01); *B65B 65/00* (2013.01); *B29C 66/72341* (2013.01); *B29K 2705/02* (2013.01); *B29L 2031/7166* (2013.01); *B65B 9/207* (2013.01); *B65B 55/103* (2013.01)

(58) Field of Classification Search
    CPC . B29C 66/872; B29C 66/849; B29C 66/8351; B29C 66/7234; B29C 66/72328; B29C 66/72321; B29C 66/71; B29C 66/4312; B29C 66/1122; B29C 66/0062; B29C 66/72341; B29K 2705/02; B29L 2031/7166
    See application file for complete search history.

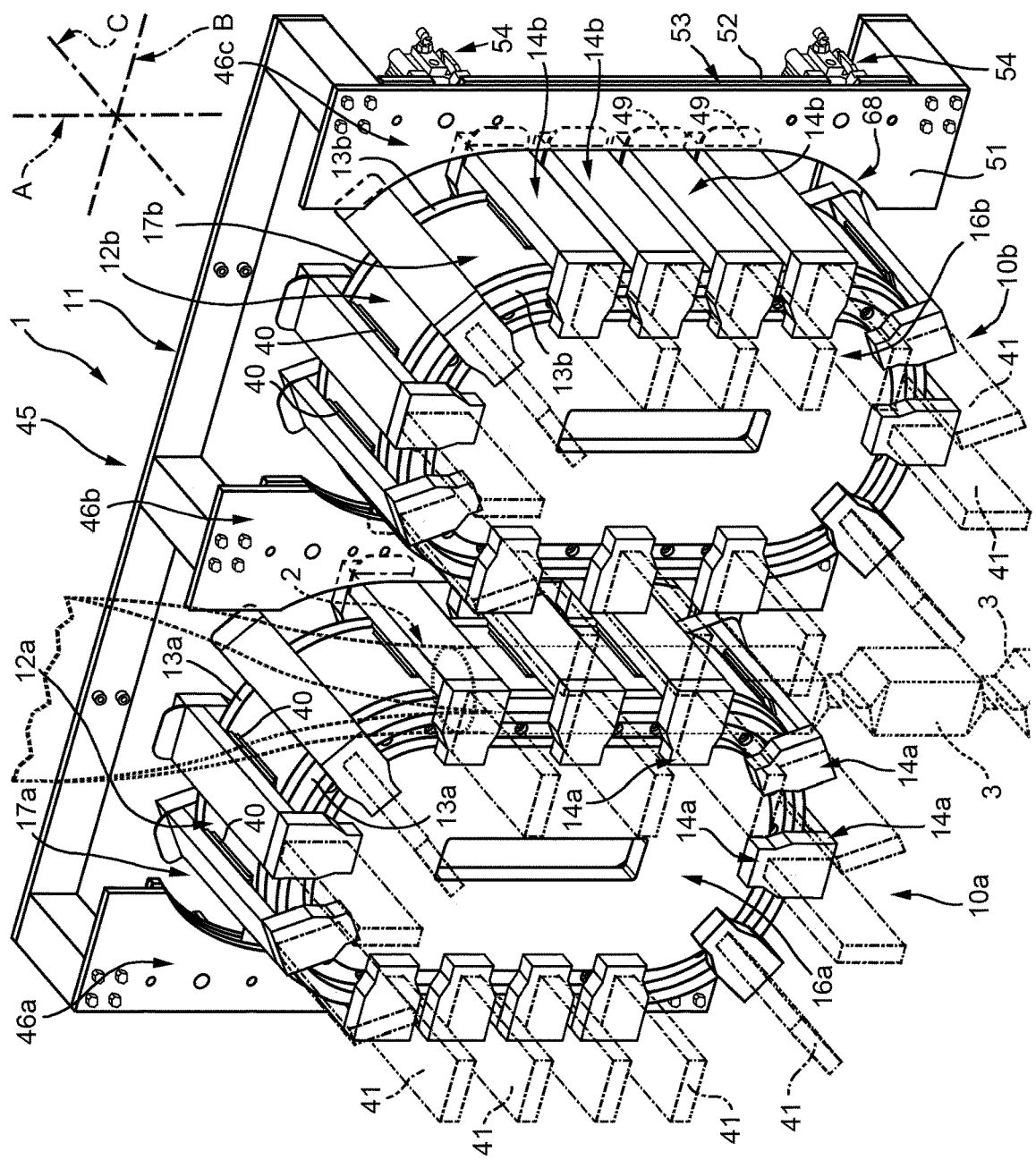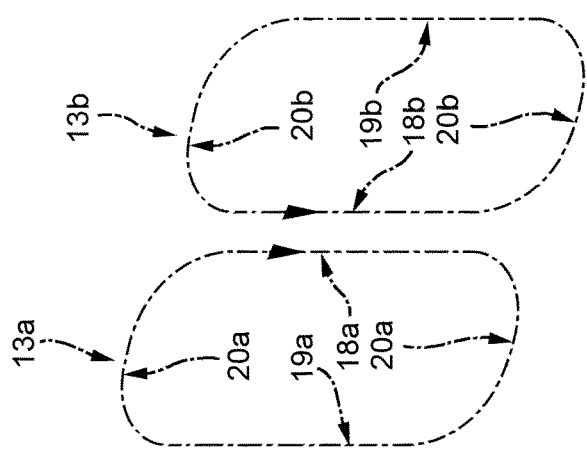
FIG. 1

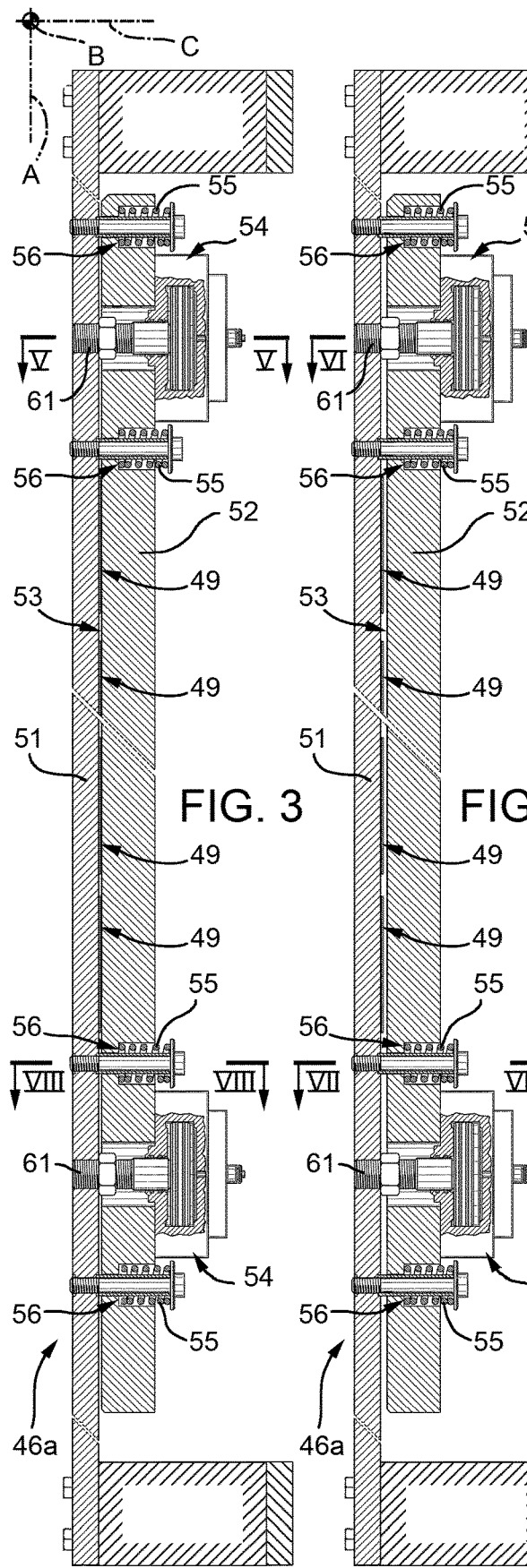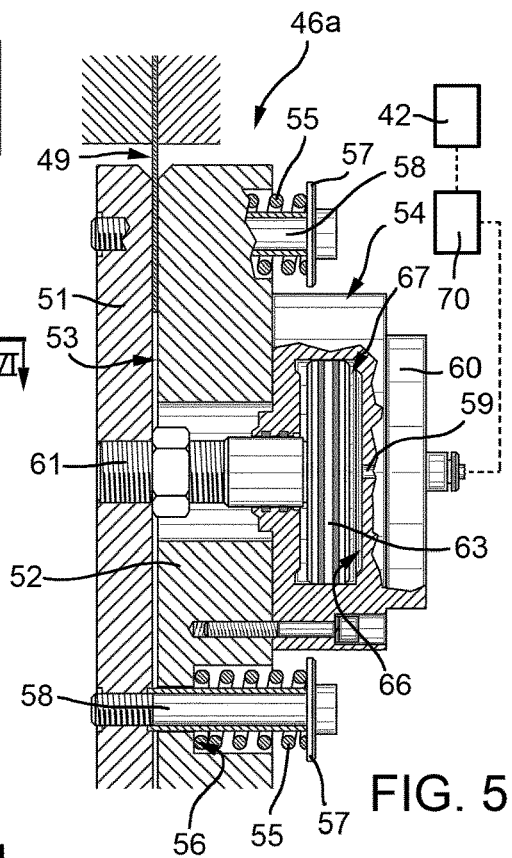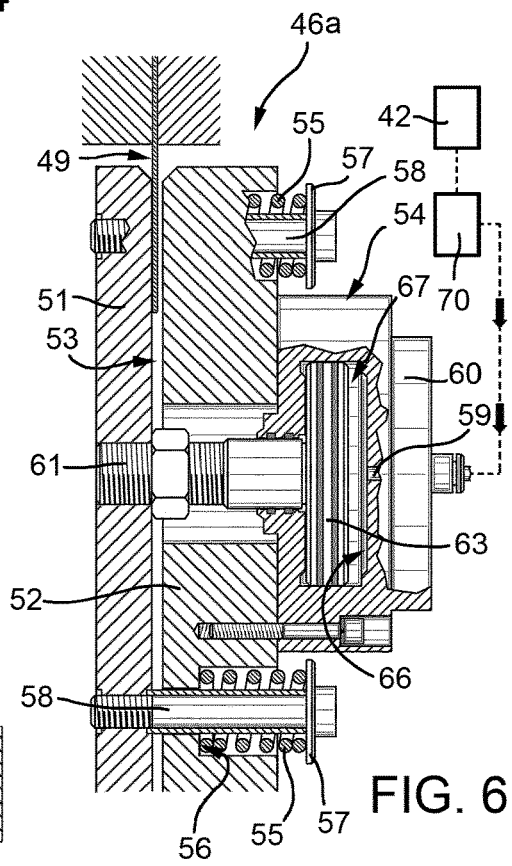

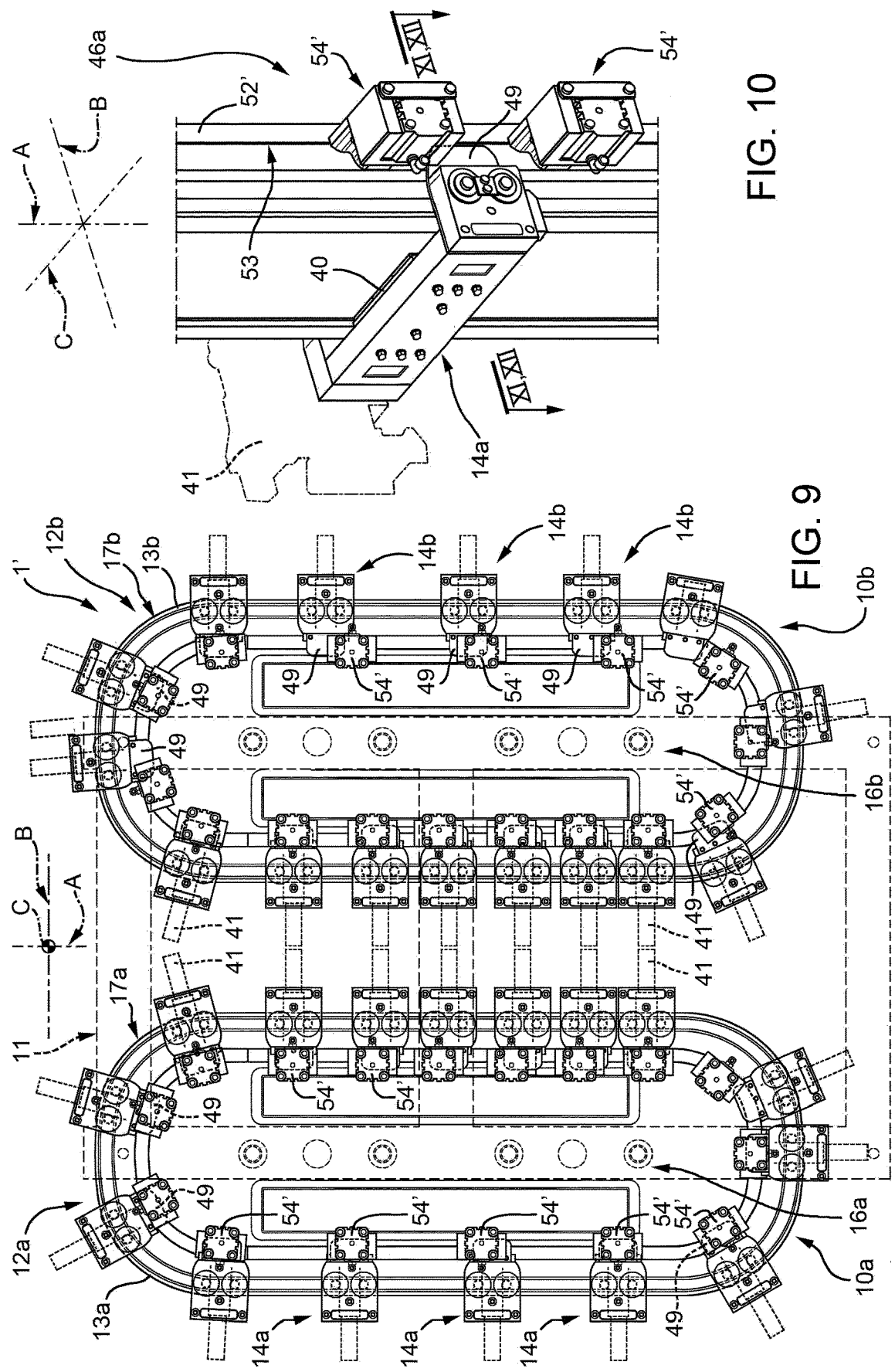

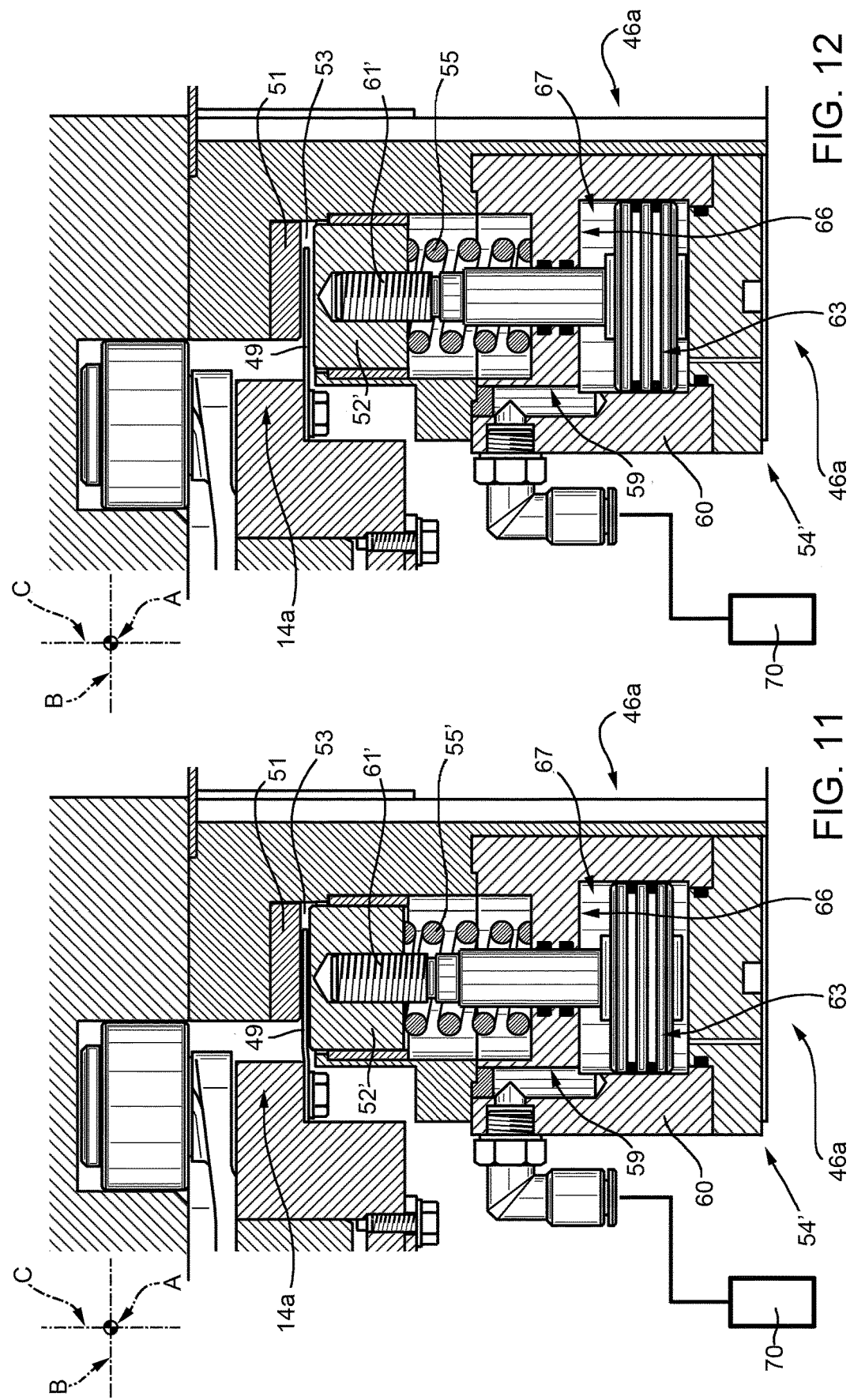

UNIT AND METHOD FOR FORMING/ADVANCING A PACK OR A PORTION OF A PACK

CROSS-REFERENCE TO RELATED PATENT APPLICATIONS

This is a National Phase of International Application No. PCT/EP2017/063339, filed Jun. 1, 2017, which claims the benefit of European Application No. 16173631.9 filed Jun. 9, 2016. The entire contents of the above-referenced applications are expressly incorporated herein by reference.

TECHNICAL FIELD

The present invention relates to a unit and a method for forming/advancing a pack or a portion of a pack.

In particular, the packs are adapted to be filled with a pourable food product, are sealed and are formed starting from a tube of packaging material. The portions of the packs are, in particular, opening devices.

BACKGROUND OF INVENTION

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by creasing and sealing laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminium foil, which is superimposed on a layer of heat-seal plastic material, and is in turn covered with another layer of heat-seal plastic material forming the inner face of the package eventually contacting the food product.

Packages of this sort are normally produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed along a vertical advancing direction.

In order to complete the forming operations, the tube is filled with the sterilized or sterile-processed food product, and is sealed and subsequently cut along equally spaced transversal cross sections.

Pillow packs are so obtained, which have a longitudinal sealing band, and a top transversal sealing band and a bottom transversal sealing band.

Recently, independently self-movable carriages have been widely applied for conveying packages or opening devices in the packaging industry.

In greater detail, each carriage substantially comprises a respective movable element which is movable along a path and is generally provided with a gripping element. The carriages are magnetically coupled with a stationary magnetic field source, so as to be advanced along the path by the magnetic force associated to the magnetic field.

In particular, it has been proposed, in the embodiment shown in FIG. 17 of WO00/64741, a packaging unit adapted to interact with the tube to heat-seal it at equally spaced cross sections and to form a plurality of pillow packs connected to the tube by transversal sealing bands crosswise to the advancing axis of the tube.

The packaging unit comprises:

a first track and a second track, which are arranged on respective opposite lateral sides of the tube; and a plurality of first carriages self-movable on the first track and a plurality of respective second carriages self-movable on the second track.

In particular, the first carriages are movable independently from each other along the first track and the second carriages are movable independently from each another along the second track.

Each first carriage is fitted with a relative sealing element and a relative half-shell, while each corresponding second carriage is fitted with a respective counter-sealing element and with a relative half-shell.

However, the packaging unit shown in FIG. 17 of WO00/64741 leaves room for improvement, especially as regards to the precise and repeatable sealing of the pillow packs in the desired position.

In particular, in case the unit needs to be stooped, the magnetic sources are deactivated, so that the carriages are no longer subjected to any magnetic force.

Accordingly, the movable elements of the carriages arranged along the vertical portion fall, under gravity action, and hit on one another, thus causing an annoying noise and generating a risk of damage.

Carriages are also used in devices for applying glue onto opening device before gluing the latter onto the formed and filled packages.

In this application, the movable elements of the carriages move along a three-dimensional trajectory including also vertical portions under a glue applicator, with the purpose of properly applying the glue on the face of the opening device intended to be glued on the package.

Also in this case, when the magnetic sources are deactivated, the movable element arranged along the vertical portion fall, under gravity action, and hit on one another, thus causing an annoying noise and generating a risk of damage.

A need is felt within the industry to prevent, as far as possible, the fall of the movable elements arranged on the vertical portion of respective paths/trajectory, when the magnetic sources are deactivated.

DISCLOSURE OF INVENTION

It is therefore an object of the present invention to provide a unit for forming/advancing a package or a portion of a package, which meets the above-identified needs.

According to the present invention, there is provided a unit for forming/advancing a pack or a portion of a pack, as claimed in claim 1.

The present invention also relates to a method for forming/advancing a pack or a portion of a pack, as claimed in claim 11.

BRIEF DESCRIPTION OF THE DRAWINGS

Three preferred, non-limiting embodiments of the present invention will be described by way of example with reference to the accompanying drawings, in which:

FIG. 1 is a perspective view of a first embodiment of a unit for forming/advancing a pack or a portion of a pack, according to the present invention;

FIG. 3 is a section along line III-III of FIG. 1 of the unit of FIGS. 1 and 2, with parts removed for clarity and in a first operative configuration;

FIG. 4 is a section along line III-III of FIG. 1 of the unit of FIGS. 1 and 2, with parts removed for clarity and in a second operative configuration;

FIG. 5 is an enlarged view of some components of FIG. 3;

FIG. 6 is an enlarged view of some components of FIG. 4;

FIG. 9 is a frontal view of a second embodiment of a unit for advancing a pack or a portion of a pack, according to the present invention;

FIG. 10 is a perspective enlarged view of some components of the unit of FIG. 9, with parts removed for clarity;

FIGS. 11 and 12 are respective sections in an enlarged view and taken along lines XI-XI and XII-XII of FIG. 10, with parts removed for clarity and respectively in a first operative configuration and in a second operative configuration.

DETAILED DESCRIPTION OF PREFERRED EMBODIMENTS

Figure 2:
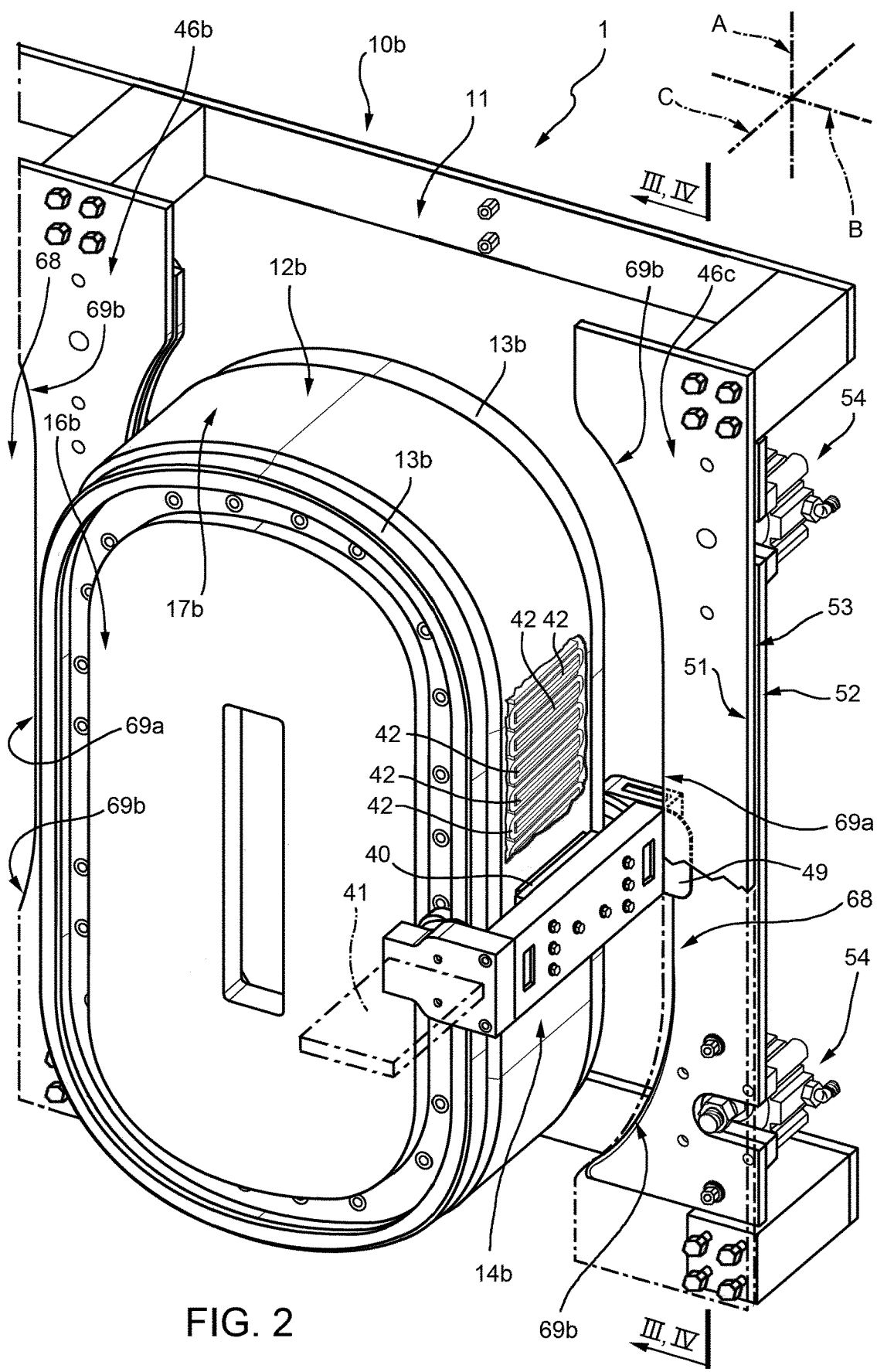
FIG. 2 is a perspective enlarged view of some components of the unit of FIG. 1, with parts removed for clarity.
Figure 7:
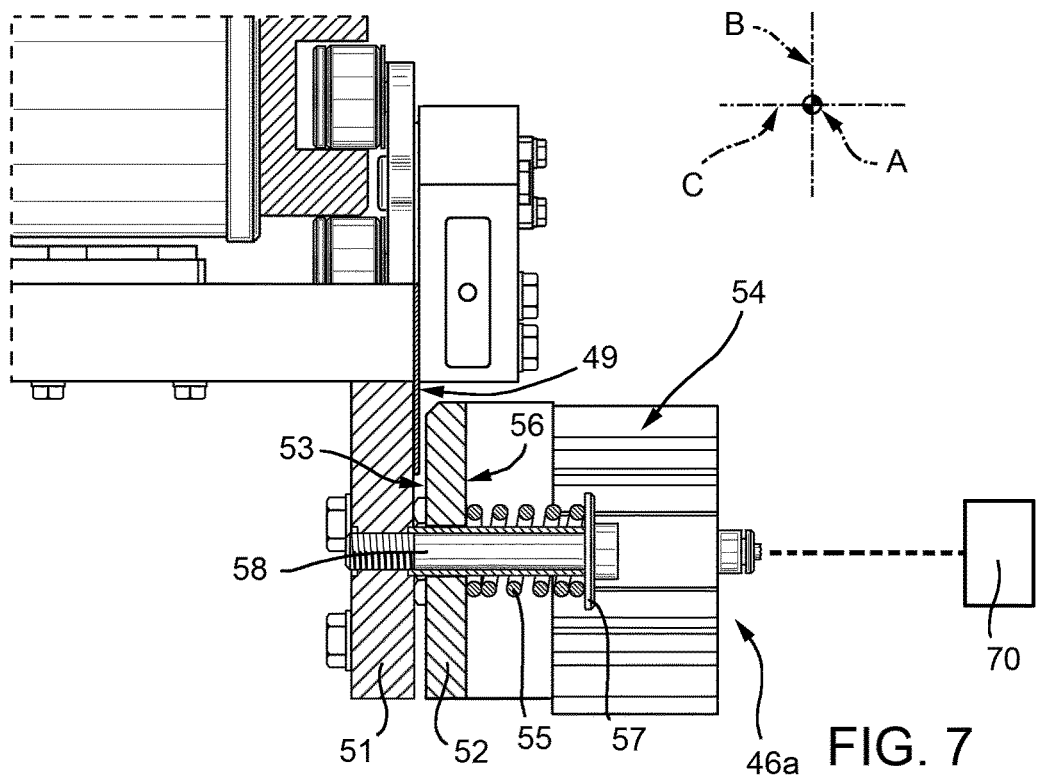
FIG. 7 is a section along line VII-VII of FIG. 3.

With reference to FIGS. 1 to 8, number 1 indicates a unit generally intended for forming and/or advancing at least one sealed pack 3 or at least one portion of a sealed pack filled with food product, such as pasteurized milk or fruit juice, from a tube 2 of sheet packaging material.

In particular, the following of the present description, without this implying any loss of generality, will make explicit reference to a unit 1 for forming and advancing sealed packs 3 filled with a pourable product.

The packaging material has a multilayer structure (not shown), and comprises a layer of fibrous material, normally paper, covered on both sides with respective layers of heat-seal plastic material, e.g. polyethylene.

In the case of aseptic packages for long-storage products, such as UHT milk, the packaging material also comprises a layer of gas- and light-barrier material, e.g. aluminium foil or ethylene vinyl alcohol (EVOH) film, which is superimposed on a layer of heat-seal plastic material, and is in turn covered with another layer of heat-seal plastic material forming the inner face of the package eventually contacting the food product.

Tube 2 is formed in known manner by longitudinally folding and sealing a web (not shown) of heat-seal sheet material, is filled by a pipe (not shown) with the sterilized or sterile-processed food product for packaging, and is fed, in known manner not shown, along a vertical path having an axis A.

It is also possible to identify:
a direction B, which is orthogonal to axis A and horizontal in the embodiment shown; and
a direction C, which is orthogonal to both axis A and direction B and is horizontal in the embodiment shown.

In greater detail, unit 1 (FIG. 1) comprises a pair of forming assemblies 10a, 10b, which are arranged on opposite lateral sides with respect to axis A and are spaced with respect to one another along direction B, and which are adapted to interact with tube 2, so as to form a number of pillow packs 3 separated from one another. Packs 3 are fed to a not-shown downstream folding unit, in which packs 3 are folded into corresponding not-shown packages.

Forming assemblies 10a, 10b interact with tube 2 to heat seal it at equally spaced cross sections and form a number of packs 3 (FIG. 1) connected to tube 2 by transversal sealing bands crosswise to axis A.

Furthermore, forming assemblies 10a, 10b interact with tube 2 to cut packs 3 along respective sealing bands, so as to separate the pillow pack from one another.

Forming assembly 10a substantially comprises:
a frame 12a, which defines a plurality, two in the embodiment shown, of endless tracks 13a spaced along direction C with respect to one another; and
a plurality of carriages 14a.

Forming assembly 10b substantially comprises:
a frame 12b, which defines a plurality, two in the embodiment shown, of tracks 13b spaced along direction C with respect to one another; and
a plurality of carriages 14b.

Carriages 14a, 14b are independently from one another and self-movable on relative tracks 13a, 13b.

Each frame 12a, 12b comprises:
two oval planar end surfaces 16a, 16b opposite to one another and parallel to direction C, lying on respective planes orthogonal to direction C and vertical in the embodiment shown;
a curved continuous surface 17a, 17b, which extends between surfaces 16a, 16b along direction C.

Unit 1 also comprises a structure 11, which is arranged on the side of surfaces 16a, 16b, and to which frames 12a, 12b are fitted.

Surfaces 17a, 17b define respective tracks 13a, 13b.

Furthermore, each track 13a, 13b lies in a vertical plane and comprises (FIG. 1):
a rectilinear portion 18a, 18b, which extends parallel to axis A and faces tube 2;
a rectilinear portion 19a, 19b, which extends parallel to axis A and is opposite to respective portion 18a, 18b; and
a pair of curved portions 20a, 20b, which are interposed between portions 18a, 18b; and 19a, 19b.

Portion 18a, 18b; 19a, 19b are, in the embodiment shown, vertical.

Portions 18a, 18b face one another and are arranged between portions 19a, 19b.

Each carriage 14a of forming assembly 10a is associated to a corresponding carriage 14b of forming assembly 10b.

In the embodiment shown, each carriage 14a and the corresponding carriage 14b form and seal a relative pack 3, as they travel along portions 18a, 18b of track 13a, 13b. Carriages 14a, 14b return along portions 19a, 19b of track 13a, 13b.

In particular, carriages 14a, 14b comprise respective not-shown half-shells.

Carriage 14a also comprises a not-shown sealing element and a not-shown extractable cutting element.

Carriage 14b also comprises a counter-sealing element and a not-shown seat, which is adapted to receive cutting element, when the latter is extracted.

Carriages 14a, 14b are self-movable on respective tracks 13a, 13b independently from one another.

Each carriage 14a, 14b substantially comprises (FIGS. 1 and 2):

a motor element 40, which extends parallel to direction C;

a tool 41 (only schematically depicted in FIGS. 1 and 2), which protrudes laterally on one side of motor element 40, is configured to interact with a relative pack 3 along portions 18a, 18b of track 13a, 13b and can move with respect to motor element 40 in order to move the relative pack and/or to carry out an operation on the relative pack.

In the embodiment shown, tools 41 of carriages 14a are provided with respective half-shells for controlling the shape of packs 3 in formation, and with respective sealing elements and respective extractable cutting elements, when carriages 14a travel along portion 18a of track 13a.

Tools 41 of carriage 14b are provided with respective half-shells corresponding to those carried by carriages 14a, and with respective counter-sealing elements adapted to interact with corresponding sealing elements to form transversal sealing bands of packs 3 and respective seats adapted to house corresponding cutting elements when packs 3 are cut along the transversal sealing bands, when carriages 14b travel along portion 18b of track 13b.

Motor element 40 is, in the embodiment shown, magnetically coupled with respective magnetic field sources 42 (FIG. 2) which are carried in fixed position by respective surfaces 17a, 17b, so that carriages 14a, 14b is self-movable along tracks 13a, 13b.

Magnetic field sources 42 can be selectively activated/deactivated on the basis of the operative conditions of unit 1 so that carriages 14a, 14b are movable on tracks 13a, 13b independently from each other.

Figure 8:
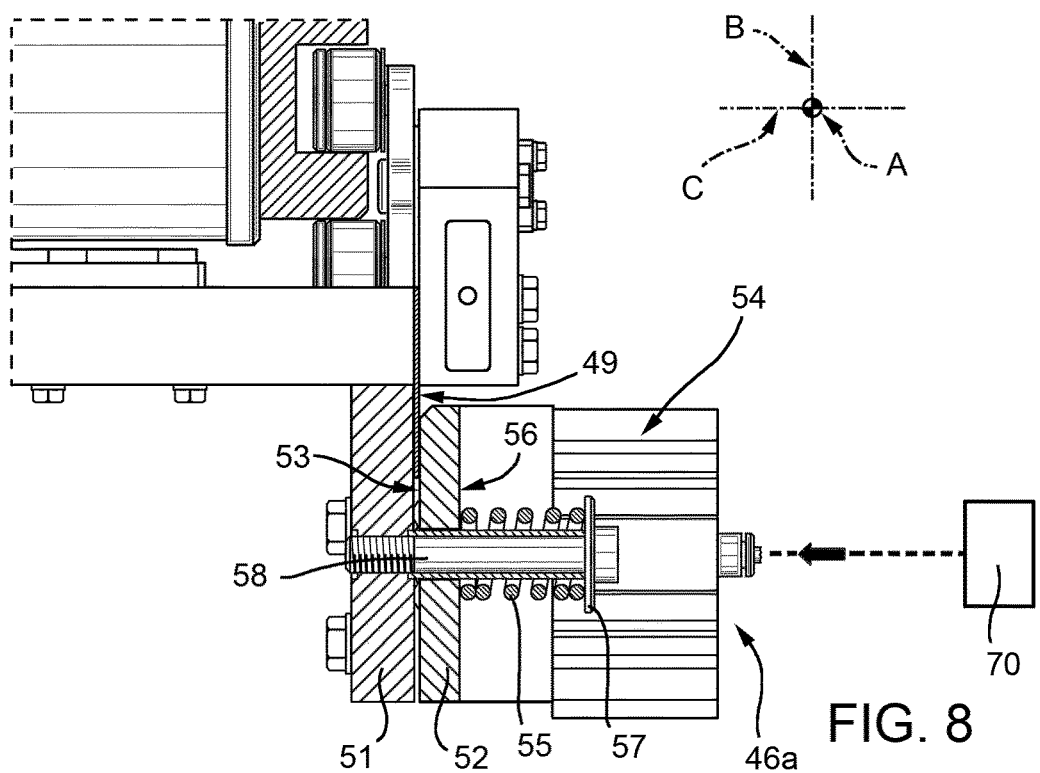
FIG. 8 is a section along line VIII-VIII of FIG. 4.

Advantageously, unit 1 comprises a stopping group 45 fitted to structure 11 and which can be operated:

to leave carriages 14a, 14b free to advance along portions 18a, 19a, 18b, 19b of track 13a, 13b when relative magnetic field sources 42 are activated (FIGS. 3, 5 and 7); and to stop carriages 14a, 14b along vertical portion 18a, 19a, 18b, 19b, when relative magnetic field sources 42 are deactivated (FIGS. 4, 6 and 8).

With particular reference to FIGS. 1 to 8, stopping group 45 comprises three stopping devices 46a, 46b, 46c which are adapted to arrest carriages 14a, 14b travelling respectively along portion 19a of track 13a, portion 18a of track 13a and portion 18b of track 13b, and portion 19b of track 13b.

Being all stopping devices 46a, 46b, 46c substantially identical to one another, only one of them will be described in the following of the present description.

In particular, stopping devices 46a, 46b, 46c are housed inside structure 11.

Stopping device 46a substantially comprises (FIGS. 3 to 8):

a wall 51, which is stationary and fitted to frame 12a; and a wall 52, which is movable relative to wall 51 back and forth parallel to axis C; and a slot 53, which is bound between walls 51, 52 parallel to axis B, and is adapted to receive relative appendixes 49 carried by carriages 14a, 14b.

In the embodiment shown, appendixes 49 are arranged at opposite side of tools 41 parallel to axis B.

In greater detail, stopping device 46a is movable between:

a release configuration (FIGS. 4, 6 and 8), in which wall 52 is spaced apart from wall 51 parallel to direction C, so as to leave appendixes 49 free to move inside slot 53;

a block configuration (FIGS. 3 and 5), in which wall 52 is pressed against wall 51 and blocks appendixes 49 inside slot 53.

Stopping device 46a is, in particular, set in the release configuration when magnetic field sources 42 are activated to move carriages 14a, 14b and is set in the block configuration, when magnetic field sources 42 are deactivated, so as to prevent carriages 14a, 14b from vertically falling along portions 18a, 18b; 19a, 19b.

Stopping device 46a further comprises:

a plurality, two in the embodiment shown, of actuators 54 for controlling the position of wall 52 with respect to wall 51; and a plurality, four in the embodiment shown, of springs 55, which are interposed between walls 51, 52.

In the embodiment shown, springs 55 pre-load wall 52 towards wall 51, i.e. pre-load stopping device 46a in the block configuration.

Actuators 54 are operated to move away, against the action of springs 55, wall 52 from wall 51, i.e. to displace stopping device 46a in the release configuration.

In the embodiment shown, each actuator 54 is interposed between two springs 55 along axis A.

As evident from FIGS. 3 to 6, each spring 55 is interposed between a shoulder 56 of wall 52 opposite to wall 51 and an abutting surface 57 of a pin 58 fixed to wall 51.

Spring 55 extends on the opposite side of wall 52 with respect to wall 51 and is, in the embodiment shown, helical.

In the embodiment shown, springs 55 and pins 58 extend parallel to axis C.

Each actuator 54 comprises (FIGS. 5 and 6):

a skirt 60, which is fixed to wall 52 on the opposite side of wall 51 along axis C; and a stem 61 fixed to wall 51 and provided with an enlarged head 63.

Due to the above-identified configuration, skirt 60 is movable with respect to stem 61 parallel to axis C and wall 51.

Skirt 60 is hollow and houses head 63.

Surface 66 and head 63 define a chamber 67 which is fluidly connectable through a duct 59 to a not-shown source of a fluid in pressure. Chamber 67 is bound, on the opposite side of wall 52, by a surface 66.

In this way, when chamber 67 is filled with fluid in pressure, skirt 60 slides along axis C with respect to stem 61 on the opposite side of wall 51 and against the action of spring 55.

Conversely, when chamber 67 is discharged, skirt and, therefore, wall 52 slides towards wall 51 under the action of spring 55.

Walls 51, 52 lie in a vertical plane.

Walls 51 of stopping devices 46a, 46b, 46c are bound, on the side of respective portion 18a, 19a of track 13a and of portion 18b, 19b of track 13b, by an edge 68 (FIGS. 1 and 2).

Edge 68 has a main straight portion 69a and a pair of end curved portions 69b. Portion 69a is arranged between portions 69b.

Edge 68 faces a portion of respective track 13a, 13b and extends substantially parallel to it.

In particular, unit 1 comprises, for each stopping device 46a, 46b, 46c, only one wall 52 and a pair of actuators 54 for all the appendices 49 of carriages 14a, 14b.

Unit 1 also comprises a control unit 70 (only schematically shown in FIGS. 5 and 6), which is controllable to activate/deactivate magnetic field sources 42 and to control the pressure inside chambers 67 of actuators 54.

In greater detail, control unit 70 is configured, in case of need, to deactivate magnetic field sources 42 at a time t0 and to control the pressure inside chambers 67 of actuators 54 in such a way to displace stopping element 46*a* in the blocking position at a time t1 subsequent to time t0.

During the time interval between time t0 and time t1, carriages 14*a*, 14*b* decelerate due to the reduction in the magnetic force up to when they reach a null speed at time t1.

Accordingly, stopping element 46*a* is effective in blocking carriages 14*a*, 14*b* before they fall along portions 19*a*, 19*b* of tracks 13*a*, 13*b* due to the gravity action rather than braking carriages 14*a*, 14*b*.

The operation of unit 1 is now described starting from a configuration, in which magnetic field sources 42 are activated and stopping elements 46*a*, 46*b*, 46*c* are kept by actuators 54 in the respective release configurations. Still more precisely, walls 52 are detached from relative walls 51 (FIGS. 4 and 6), thanks to the action of the pressure inside chambers 67 which contrasts the elastic pre-load of springs 55.

Accordingly, carriages 14*a*, 14*b* move along respective tracks 13*a*, 13*b* and relative appendices 49 pass through corresponding slots 53.

In the meanwhile, tube 2 of packaging material is fed parallel to axis A between forming assemblies 10*a*, 10*b*.

As carriages 14*a*, 14*b* move along respective portions 18*a*, 18*b* of tracks 13*a*, 13*b*, corresponding tools 41 interact with one another and/or with tube 2, so as to form, seal and separate packs 3.

In the embodiment shown, half-shells of tools 41 of carriage 14*a*, 14*b* cooperate with one another to control the shape of packs 3 while sealing elements of tools 41 of carriages 14*a* cooperate with counter-sealing elements of tools 41 of carriages 14*b* to heat seal tube 2 at equally spaced cross-section and to form respective bottom transversal sealing bands of packs 3.

Furthermore, the cutting elements carried by tools 41 of carriages 14*a* are extracted up to when they are housed inside seats carried by carriages 14*b*, so as to cut packs 3 along respective transversal sealing bands and to separate those packs 3 form tube 2.

As carriages 14*a*, 14*b* move along respective portions 19*a*, 19*b* of tracks 13*a*, 13*b*, respective tools 41 do not interact with tube 2.

When it is necessary to interrupt the operation of unit 1, control unit 70 deactivates magnetic field sources 42. As a result of the consequent decrease in the magnetic field generated by magnetic field sources 42, carriages 14*a*, 14*b* decelerate in a time interval starting from time t0 up to when they stop at time t1.

Control unit 70 causes, at time t1, the discharge of chambers 67 of respective actuators 54.

Springs 55 elastically load skirts 60 and, therefore, wall 52 towards wall 51, up to a position in which wall 52 blocks appendixes 49 inside slot 53.

Accordingly, carriages 14*a*, 14*b* travelling along vertical portions 18*a*, 18*b*, 19*a*, 19*b* of tracks 13*a*, 13*b* are stopped and prevented from falling due to the gravity action.

When it is necessary to restart again the operation of unit 1, control unit 70 activates magnetic field sources 42 and increases the pressure in chambers 67 Accordingly, wall 52 is again moved away from wall 51, against the action of springs 55, and appendixes 49 are free to move inside slots 53. Thus, carriages 14*a*, 14*b* are free to move again along portions 18*a*, 18*b*, 19*a*, 19*b* of tracks 13*a*, 13*b*.

Number 1' in FIGS. 9 to 12 indicates a second embodiment of a unit in accordance with the present invention; unit 1, 1' being similar to each other, the following description is limited to the differences between them, and using the same references, where possible, for identical or corresponding parts.

Unit 1' differs from unit 1 for comprising an actuator 54' for each carriage 14*a*, 14*b* and in that springs 55' are integrated inside relative actuators 54'.

In greater detail (see FIG. 9), unit 1' comprises a higher number of actuators 54' in portions 18*a*, 18*b* of track 13*a*, 13*b* than in portions 19*a*, 19*b*.

Furthermore, each actuator 54' comprises a relative wall 52' which bounds slot 53 together with wall 51.

Each actuator 54' also differs from corresponding actuator 54 in that skirt 60 is stationary, and stem 61' is screwed to relative wall 52' and is movable parallel to direction C with respect to skirt 60.

Furthermore, each actuator 54' differs from corresponding actuator 54 in that spring 55' is wound about stem 61'.

Finally, each actuator 54' differs from corresponding actuator 54 in that surface 66 bounds chamber 67 on the side of relative wall 52'.

In this way, when control unit 70 pressurizes chambers 67 (FIG. 12), stems 61' and walls 52' move away from wall 51. Differently, when control unit 70 discharges chambers 67 (FIG. 11), stems 61' and walls 52' move towards wall 51.

Control unit 70 is programmed for stopping carriages 14*a*, 14*b* in positions, in which respective appendices 49 are aligned with corresponding stems 61' parallel to axes C.

The operation of unit 1' differs from the one of unit 1 in that each actuator 54' are operated by control unit 70 to keep relative wall 52' spaced from wall 51, and in that when chambers 67 are pressurized/discharged, stems 61' move away from/towards wall 51.

Figure 13:
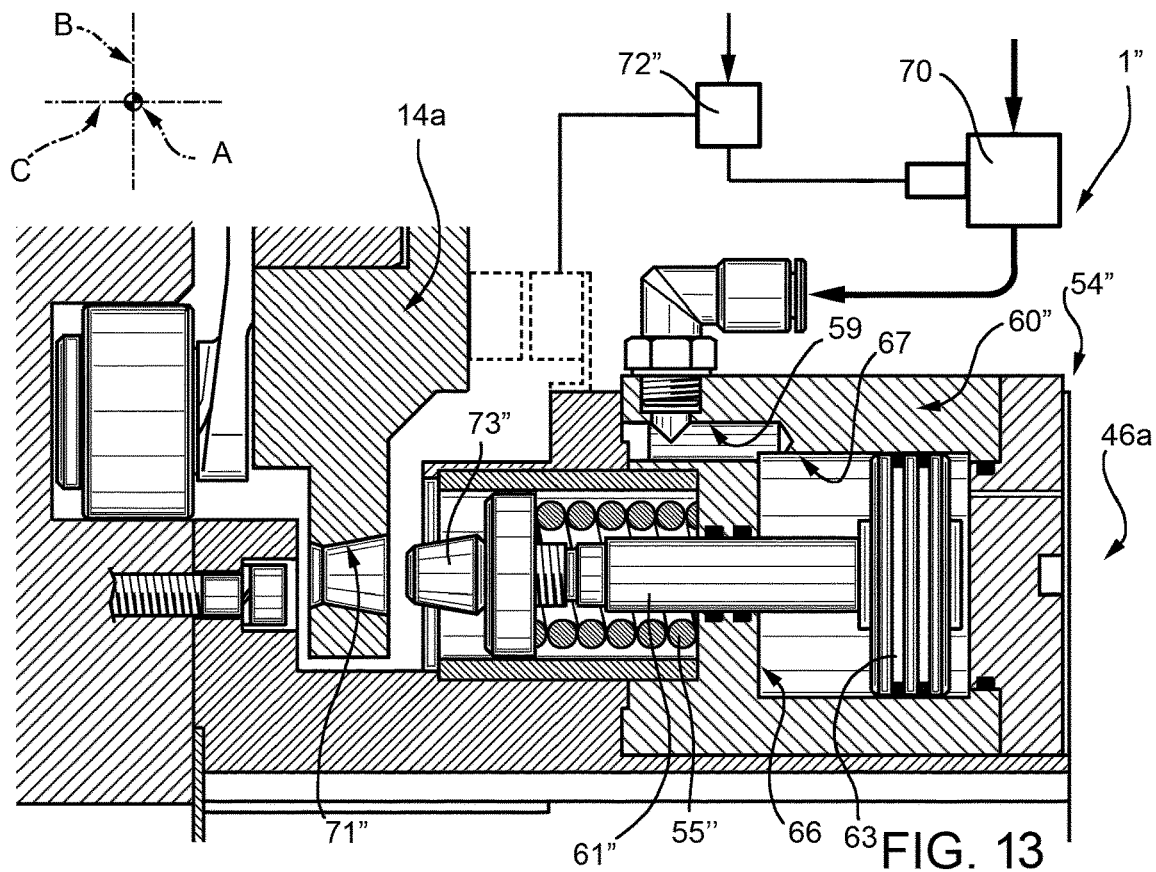
FIGS. 13 and 14 are section in enlarged view of a third embodiment of the unit of FIGS. 1 to 12.
Figure 14:
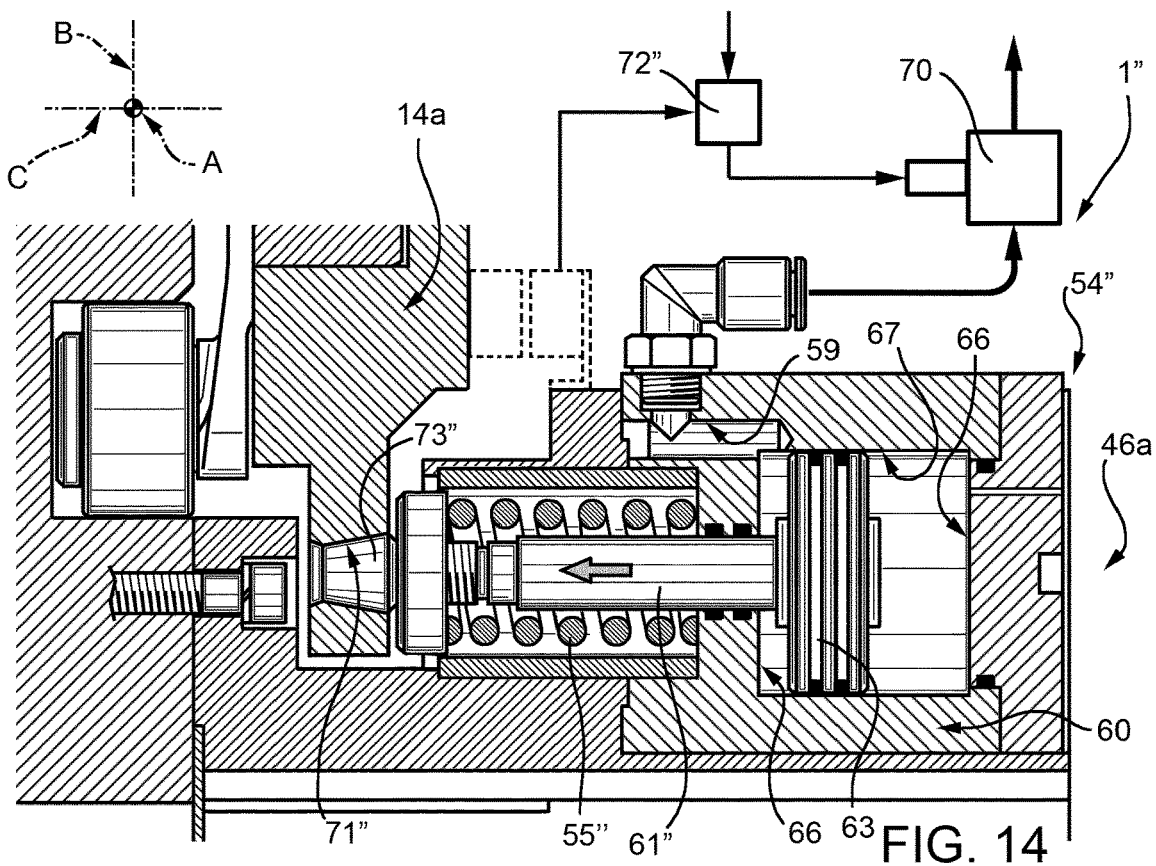

Number 1" in FIGS. 13 and 14 indicates a third embodiment of a unit in accordance with the present invention; unit 1', 1" being similar to each other, the following description is limited to the differences between them, and using the same references, where possible, for identical or corresponding parts.

Unit 1" differs from unit 1' for comprising instead of appendixes 49 a plurality of holes 71" carried by respective carriages 14*a*, 14*b* and a plurality of pins 73" carried by relative stems 61" of actuators 54'. Pins 73" have a shape corresponding to the shape of relative holes 71" and are movable parallel to direction C together with stem 61".

The operation of unit 1" differs from the one of unit 1 in that:
when stopping devices 46*a*, 46*b*, 46*c* are in the respective block configurations (FIG. 14), springs 55' keep pins 73' engaged in holes 71", thus preventing carriages 14*a*, 14*b* from moving along portion 18*a*, 18*b*, 19*a*, 19*b* of tracks 13*a*, 13*b*; and
when stopping devices 46*a*, 46*b*, 46*c* are in the release configurations (FIG. 13), control unit 70 controls actuators 54" so as to thrust, against the action of springs 55', pins 73" outside relative holes 71" and therefore, to leave carriages 14*a*, 14*b* free to move along portions 18*a*, 18*b*, 19*a*, 19*b* of tracks 13*a*, 13*b*.

In particular, unit 1" comprise a sensor 72" (FIGS. 13 and 14) adapted to generate a signal associated to the position of holes 71" with respect to track 13*a*, 13*b*.

Control unit 70 is configured to control actuators 54" also on the basis of the signal generated by sensor 72".

The advantages of unit 1, 1', 1" and of the method according to the present invention will be clear from the above description.

In particular, unit 1, 1', 1" comprise stopping group 45 which can be operated:

to leave carriages 14a, 14b free to advance along vertical portions 18a, 18b; 19a, 19b and to stop carriages 14a, 14b along vertical portions 18a, 18b; 19a, 19b, when magnetic field sources 42 are activated; and to stop carriages 14a, 14b along vertical portions 18a, 18b, 19a, 19b, when magnetic field sources 42 are deactivated.

In this way, in case magnetic field sources 42 are deactivated, during the operation of unit 1, 1', 1", carriages 14a, 14b are stopped by stopping group 45 and do not fall along vertical portions 18a, 18b under gravity action.

Carriages 14a, 14b are, therefore, prevented from hitting against one another, thus reducing the risk of damaging of carriages 14a, 14b and/or generating annoying noises.

Springs 55, 55', 55" pre-load stopping means 46a, 46b, 46c towards the block configuration, while actuators 54, 54', 54" can be operated to displace stopping means 46a, 46b, 46c towards the release configuration.

In this way, spring 55, 55', 55" are effective, also in case actuators 54, 54', 54" are out of service, in avoiding the fall of carriages 14a, 14b.

Finally, control unit 70 is configured, in case of need, to deactivate magnetic field sources 42 at a time t0 and to control the pressure inside chambers 67 in such a way to displace stopping element 46a, 46b, 46c in respective blocking positions at a time t1 subsequent to time t0.

Accordingly, stopping group 45 are effective in blocking carriages 14a, 14b into respective positions along vertical portions 18a, 18b; 19a, 19b while the deceleration of carriages 14a, 14b is achieved by suitably controlling magnetic field sources 42.

Clearly, changes may be made to unit 1, 1', 1" and to the method as described and illustrated herein without, however, departing from the scope defined in the accompanying claims.

Springs 55 could be integrated in actuators 54 in a way similar to springs 55', 55" integrated in respective actuators 54', 54".

Springs 55', 55" could be arranged outside respective actuators 54', 54" in a way similar to spring 55 integrated in actuator 54.

Unit 1, 1', 1" could be adapted for applying glue onto opening devices before gluing the latter onto the formed, filled and folded packages.

In this application, carriages 14a, 14b would move along a three-dimensional trajectory including also vertical portions under a glue applicator, with the purpose of properly applying the glue on the face of the opening devices intended to be glued on the respective packages.

Also in this case, stopping group 45 would be adapted to stop carriages 14a, 14b, when magnetic field sources 42 are deactivated, so as to preventing the fall of carriages 14a, 14b along the vertical portions.

The invention claimed is:

1. A packaging unit for advancing at least one pack portion, comprising:
    a stationary frame;
    a carriage movable along an endless track comprising at least one vertical portion, wherein the carriage is configured to convey the at least one pack portion;
    a stopping unit arranged outside of the endless track and configured to:
        allow the carriage to advance along the vertical portion when the carriage receives power from a power source; and
        stop the carriage from advancing along the vertical portion when the power source is deactivated,
    wherein the carriage has a first stop element having an appendix that protrudes from the carriage and wherein the first stop element is configured to engage with a second stop element of the stopping unit, and
    wherein the stopping unit is selectively movable between: (1) a release configuration in which the first stop element and second stop element are decoupled; and (2) a stop configuration, in which the first stop element and second stop element block one another, wherein the stopping unit comprises:
        a first wall and a second wall that together define a slot through which the appendix is movable when the carriage moves along the vertical portion, the first wall being stationary with respect to the frame;
        the second wall defining the second stop element and being selectively movable between: (1) a closed position in which the second wall cooperates with the first wall to thereby block the appendix inside the slot, and (2) an open position in which the second wall is detached from the first wall to thereby allow the appendix to move in the slot.

2. The packaging unit of claim 1, wherein the stopping unit comprises:
    an elastic mechanism for elastically pre-loading the second wall into one of the open position and closed position; and
    an actuator configured to displace, against operation of the elastic mechanism, the second wall towards the other one of the open position and closed position.

3. The packaging unit of claim 2, wherein the elastic mechanism pre-loads the second wall towards the closed position, and the actuator displaces the second wall into the open position.

4. The packaging unit of claim 3, wherein the elastic mechanism and the actuator are integrated.

5. The packaging unit of claim 2, wherein the stopping unit comprises a single second stop element configured to selectively block the first stop element associated with each respective carriage travelling along the vertical portion.

6. The unit of claim 1, further comprising a control unit, which is programmed for:
    deactivating power to the carriage at a first time instant to thereby decelerate the carriage; and
    operate the stopping unit to stop the carriage at a second time instant subsequent to the first time instant to thereby stop the carriage,
    wherein the carriage decelerates in a time interval bound by the first time instant and the second time instant.

7. The packaging unit of claim 1, further comprising:
    at least one endless track for carrying a plurality of selectively activatable magnetic sources; and
    a plurality of the carriages comprising respective motor elements magnetically coupled with the magnetic sources and independently movable of one another along the track.

8. A method for advancing at least one portion of a pack, comprising:
    selectively actuating a power source;
    coupling at least one carriage with the power source;
    moving the carriage along an endless track comprising a vertical portion;
    conveying the at least one pack portion along the path by the carriage;
    leaving the carriage free to advance along the vertical portion when the power source is activated;

stopping the carriage along the vertical portion when the power source is deactivated selectively moving a stopping unit between: (1) a release configuration in which a first stop element and a second stop element are decoupled, wherein the first stop element is an appendix protruding from the carriage, and (2) a stop configuration in which the first stop element and second stop element block one another, wherein the carriage comprises the first stop element and the stopping unit comprises the second stop element, wherein:
the stopping unit is arranged outside of the endless track and comprises a first wall and a second wall that define a slot through which the appendix is movable when the carriage moves along the vertical portion, the first wall being stationary with respect to the frame,
the second wall defines the second stop element;

selectively moving the second wall between: (1) a closed position in which the second wall cooperates with the first wall to block the appendix in the slot, and (2) an open position in which it is detached from the first wall to thereby allow the appendix to move in the slot.

9. The method of claim 8, further comprising:

elastically pre-loading the second wall into one of the open position and closed position; and operating an actuator to displace the second wall towards the other one of the open position and closed position.

10. The method of claim 8, further comprising:

deactivating the power source at a first time instant to thereby cause the carriage to decelerate; and operating the stopping unit to stop the carriage at a second time instant subsequent to the first time instant to thereby stop the carriage; and decelerating the carriage in a time interval bound by the first time instant and the second time instant.

\* \* \* \* \*